Feb. 15, 1966     D. P. SMITH     3,234,586
AUTOMATIC VALVE TOOL
Filed Sept. 15, 1964
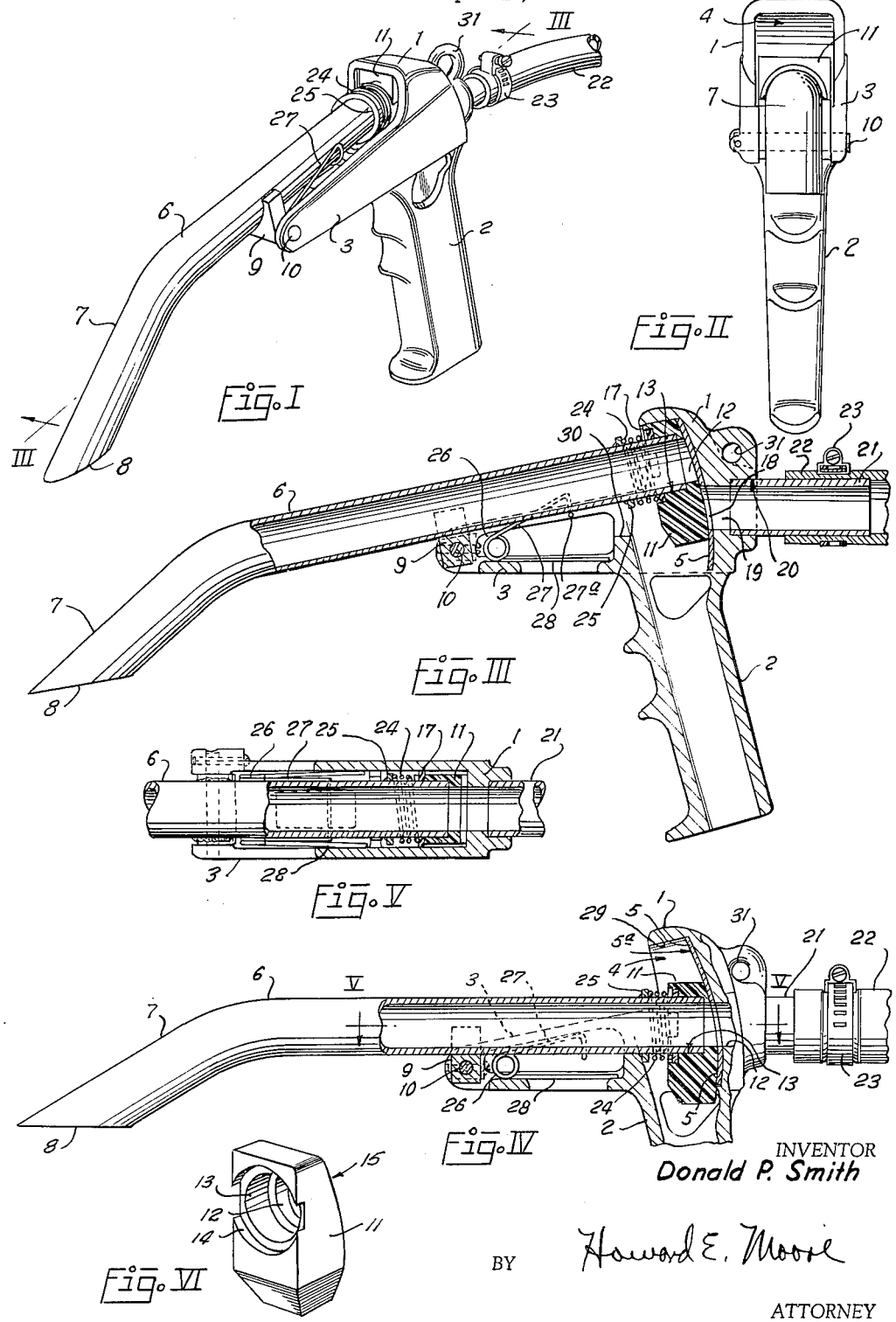
INVENTOR
Donald P. Smith
BY Howard E. Moore
ATTORNEY

3,234,586
AUTOMATIC VALVE TOOL
Donald P. Smith, Dallas, Tex., assignor to Litton Precision Products, Inc., Palo Alto, Calif., a corporation of Delaware
Filed Sept. 15, 1964, Ser. No. 396,557
7 Claims. (Cl. 17—11)

This invention is concerned with a device for applying vacuum or pressure to specific areas of a product or article, and is specifically concerned with an automatic valve tool wherein the valve establishing communication between the source of vacuum or pressure and the outlet or inlet nozzle is opened by manual pressure applied through the nozzle to the area where the pressure or vacuum is applied.

The tool hereinafter described is particularly adaptable for applying vacuum to specific areas of a product to remove undesirable portions thereof. For instance, it is particularly adaptable in removing lungs, hearts, and kidneys, and other recessed elements, from the body cavity of a fowl in eviscerating same.

In the processing of poultry, fish, grain and other products the individual items are often subjected to a vacuum passed over the surface thereof to remove undesirable portions or foreign particles therein. For instance, in processing poultry an opening is provided at the rear of the carcass through which intestines, etc. are removed, but certain portions thereof, such as the lungs, kidneys, etc. are recessed within the wall of the cavity of the fowl. It has been found that an effective way of removing such recessed organs and loose materials within the body cavity is to apply a vacuum thereto through a nozzle which may be inserted into the body cavity.

In order to avoid the wastage of vacuum by a continuously open vacuum tube, and the removal of fat and other valuable portions adjacent to the undesirable portions within the body cavity of the fowl, it has been customary to provide a hand operated trigger or a remote foot operated valve to open and close the vacuum tube when the open end thereof is not in contact with the area where undesirable organs or particles are to be removed. Such manually controlled valves give difficulty in coordination, cause operator fatigue and have a tendency to be held open much longer than absolutely necessary during repetitive operations. Thus, valuable strings of skin or fat are removed from the carcass with the undesirable portions.

The present invention is intended to overcome the foregoing recited problems by providing a valve tool which is normally closed and which opens only when the tip of the nozzle is pressed on or near the portion intended to be picked up by the vacuum. Therefore, coordination of valve opening and proper placement at the desired place in the body cavity of the fowl is automatic. Furthermore, such tool utilizes only the minimum amount of air volume, because the tool is open only when it is actually needed and when the valve is open the tip of the pick-up tube is partially closed by the surface against which it is pressed so that the amount of air flow through the pick-up tube is greatly restricted in comparison to an open tube, previously used. It has been found by experience that in actual practice the pick-up tube is generally less than one-third open when in use and then for less than 10% of the time.

The automatic valve tool hereinafter described and claimed, although primarily intended for use in vacuum removal of undesirable portions from the body cavity of fowls, or other suction applications may also be used in pressure application such as for applying lubricants, air pressure for spot cleaning and for other similar applications, and of course, may assume various forms, depending upon the specific application.

It is, therefore, the primary object of the invention to provide a tool for applying vacuum or pressure to a surface for removing undesirable portions thereof, or treating same, or applying material thereto, having a valve therein which is automatically opened to establish communication between the sources of vacuum or pressure and the applicator or suction nozzle by pressing the nozzle against the surface to be treated or conditioned, and wherein the valve is automatically closed by release of the pressure of the nozzle against the surface.

Other and further objects of the invention, in addition to the foregoing, will become apparent upon reading the detailed specification hereinafter following and by referring to the drawing annexed hereto.

A suitable embodiment of the invention is shown in the attached drawing wherein, FIGURE I is a top perspective view of the automatic valve tool incorporating the improvements constituting the invention described and claimed herein.

FIGURE II is a front elevational view thereof.

FIGURE III is a partially sectionalized side elevational view of the device, showing the automatic valve in closed position.

FIGURE IV is a partially sectionalized side elevational view of the device, showing the valve in open position.

FIGURE V is a partially sectionalized top plan view of the device and,

FIGURE VI is a front perspective view of the valve block.

Numeral references are employed to designate the various parts shown in the drawings and like numerals indicate like parts throughout the various figures of the drawings.

The numeral 1 indicates a hollow body which is preferably made of lightweight metallic material, such as aluminum. The body 1 includes a hand grip 2 extending therefrom, and a forwardly extending bifurcated nozzle support extension 3.

A slide insert 5, made of relatively hard metal, with a smooth finish on the inner surface thereof, is secured on the inner side of the cavity 4 provided in the body 1. The slide insert is for the purpose of providing a smooth surface over which the valve block 11, hereinafter described, may slidably move in passing from closed to open position, in the manner hereinafter described.

A tubular vacuum or pressure nozzle 6 includes a downwardly turned portion 7 terminated at its outer end by a substantially horizontal surface 8.

The nozzle 6 is secured to a pivot saddle support 9, as by welding, and the pivot saddle 9 is pivotally attached between the spaced sides of the bifurcated support 3 by means of a pivot pin 10.

A valve block 11, is preferably made of tough resilient sealing material, such as "Teflon." The valve block 11 has a main bore 12 therethrough which is intersected by a counterbore 13.

An annular seal recess 14 is provided on the inner side of the valve block 11 surrounding the bores 12 and 13, and a substantially arcuate surface 15 is provided on the outer side of seal block 11, which arcuate surface 15 substantially coincides with the arcuate inner surface 5a of the slide insert 5. Said surfaces 15 and 5a are slidably and sealingly engaged.

A resilient seal ring 17 is disposed in the seal recess 14 and has a central opening therethrough, through which the inner end of the nozzle 6 may be inserted, as the inner end of the nozzle 6, is forced into the counterbore 13, to provide a seal about the end of the tubular nozzle 6 to prevent escape of pressure or suction thereabout.

The slide insert 5 has a passage 18 therethrough which coincides with the passage 19 through the body 1. A counterbore 20 is provided in the passage 19 into which a connection tube 21 may be inserted. A flexible pressure or suction conduit 22 has an end disposed about the connection tube 21. A hand clamp 23 is disposed about the hose 22 and drawn into tight engagement therewith to provide a seal connection between the flexible hose 22 and the connection tube 21.

A compression spring 24 is disposed about the tubular nozzle 6. The inner end of said spring is disposed against the seal ring 17 and the other end is in contact with the annular stop shoulder 25 secured to nozzle 6.

A tension spring 26 is disposed between the arms of the bifurcated extension support 3 and has spaced legs 27 extending therefrom terminated by connected end 27a embracing the lower side of the tubular nozzle 6.

Lower spaced legs 28 of the spring 26 engage the body 1 between the bifurcated legs of the support 3. The spring arms 27 normally urge the inner end of the nozzle 6 upward, to maintain the valve block 11 in upward position, as shown in FIGURE III.

When the outer end 8 of the nozzle 6 is pressed downwardly against a surface, the nozzle 6 will be caused to pivot about the pivot pin 10 against the spring arms 27, to bring the bore of the nozzle 6 into alignment with the passages 18 and 19 through the slide insert 5 and body 1, thereby establishing communication between the suction or pressure supply hose 22 and the nozzle 6, as shown in FIGURE IV.

It may be noted in passing that the mode of operation of the present tool is facilitated by the orientation of the work-engaging opening 8 of the nozzle 6 in a plane generally perpendicular to the direction of movement of the nozzle. The opening also faces opposite the direction of movement of the nozzle 6 relative to the body or housing 1 required for opening the valve so that pressure on the handle 2 forcing the opening 8 into engagement with a work object energizes the tool.

When the downward pressure is released from the nozzle 6, the spring arms 27, will counter-rotate the tubular nozzle 6, to move the valve block 11 to upward position, as shown in FIGURE III, thereby bringing the solid portion of the valve block 11 across the passages 18 and 19, and closing off communication between the supply hose 22 and tubular nozzle 6. The upper shoulder 29 provides a stop to limit the upward movement of the valve block 11 and the pivotal movement of the nozzle 6. The body 1 includes a cradle-like portion 30 extending between the bifurcated arms of the extension support 3, against which the tubular nozzle 6 engages, to provide a stop against further downward movement of the valve block 11. Such stop 30 stops the downward movement of the valve block 11 when the passages 18 and 19 are in registry with the bore of the tubular nozzle 6.

A hanger eye 31 is provided on the body 1 which may be passed over an appropriate hook or bracket on which the device may be suspended.

In use the nozzle 6 may be placed into the body cavity of a fowl being dressed or at other suitable locations where it is desirable to pick up foreign or undesirable material or at which pressure or material is to be applied. Downward pressure is exerted against the end of the nozzle 6 sufficient to cause the nozzle 6 to pivot against the spring 27 and bring the bore of the nozzle 6 into alignment with the supply hose 22, to thereby provide a suction to pick up the foreign material and suck same through the hose 22. Upon release of the downward pressure against the end of the nozzle 6, the spring arms 27, will pivot the inner end of the nozzle 6 upwardly, to bring the valve block 11 to upward position, thereby closing the passages 18 and 19, and cutting off the suction or pressure, as the case may be.

The same operation would be performed in applying a pressure or material through the nozzle 6 to a selected location.

It will be seen that I have provided a tool well adapted for the purposes hereinbefore described, in which an automatic valve is provided which is moved to open position by exerting a pressure against the supply or suction nozzle, and which automatically closes when the pressure is released. By virtue of such arrangement pressure or suction is conserved, the suction or pressure may be accurately applied at the desired location and may be automatically cut off when removed from such location, thereby assuring that only the undesirable or foreign materials are picked up, and that suction or pressure is not applied to areas where it is not desired to remove desirable material. Similarly, pressure or materials may be readily and economically applied to desired locations. The device minimizes fatigue by operators, is simple and easy to use, and inexpensive to manufacture.

It will be understood that other and further forms of the invention may be devised and still remain within the spirit and scope of the appended claims.

Having described my invention I claim:

1. In a device of the class described, a hollow housing having a handle thereon, an inlet passage in the housing; conduit means arranged to supply pressure or suction to said inlet passage; a tubular nozzle pivotally attached to the housing; a valve member, having a passage therethrough, mounted on the inner end of the nozzle with the bore of the nozzle communicating with the passage through the valve member; the valve member being slidably related to the housing; spring means between the body and the inner end of the nozzle to normally urge the valve member to a position in the housing so that the passage through the valve member does not coincide with the inlet passage in the housing, but said spring being retractable in response to pressure exerted against the outer end of the nozzle to cause the valve member to move to a position in the housing so that the passage in the valve member moves into registry with the inlet passage of the housing.

2. The combination called for in claim 1 wherein the nozzle is deflected downwardly adjacent its outer end and is terminated by a surface diagonal to the axis of the deflected portion.

3. The combination called for in claim 1 wherein the valve member is made of resilient seal material.

4. The combination called for in claim 1 with the addition of stop means to limit the upward movement of the valve member with relation to the housing; and stop means to stop the downward movement of the valve member.

5. A generally pistol shaped suction device comprising:
a housing having a handle similar to a pistol grip;
an inlet connected to said housing;
a hollow nozzle pivotally connected to said housing, and movable between an operative position where it is coupled to said inlet and makes a predetermined angle with respect to said handle, and a closed position where said nozzle and said inlet are both closed and the angle between the nozzle and the handle is less than said predetermined angle; and
spring means for biasing said nozzle to the closed position;
said nozzle being provided with an opening on one side facing in the same direction as the handle for engagement with objects to be cleaned so the suction device is energized by applying the nozzle opening to the objects to be cleaned while holding the suction device by the handle, thus increasing the angle between the pistol grip handle and the nozzle and connecting the nozzle to the inlet.

6. A generally pistol shaped suction device comprising:
a housing having a handle similar to a pistol grip;
an inlet connected to said housing;
a hollow nozzle movably connected to said housing, and movable between an operative position where it is coupled to said inlet and a closed position where said nozzle and said inlet are both closed, said nozzle being provided with a work-engaging opening at its outer end, said work-engaging opening being oriented in a plane generally perpendicular to the direction of movement of the outer end of said nozzle and opening in a direction opposed to the direction of movement of the nozzle relative to said housing from its closed to its open position; and spring means for biasing said nozzle to the closed position, whereby the suction device is energized when the opening in the nozzle is engaged with the work by applying pressure on the handle and moving the nozzle relative to the handle.

7. In a device of the class described, a housing, a pressure or suction supply conduit connected to said housing, a tubular nozzle movably mounted on said housing, said nozzle having a work-engaging surface extending perpendicular to the direction of movement of said nozzle relative to said housing, a normally closed valve between the nozzle and the supply conduit, and means to open said valve to cause communication between the nozzle and supply conduit responsive to the application of said work-engaging opening to a product to which pressure or suction is to be applied through the nozzle.

References Cited by the Examiner
UNITED STATES PATENTS

| | | | |
|---|---|---|---|
| 2,175,643 | 10/1939 | Replogle | 137—616 X |
| 2,723,831 | 11/1955 | Ine | 17—11 |

SAMUEL KOREN, *Primary Examiner.*

LUCIE H. LAUDENSLAGER, *Examiner.*